United States Patent
Ahn et al.

(10) Patent No.: US 9,246,195 B1
(45) Date of Patent: Jan. 26, 2016

(54) RECHARGEABLE BATTERY

(71) Applicant: Samsung SDI Co., Ltd., Yongin-si, Gyeonggi-do (KR)

(72) Inventors: Byungkook Ahn, Yongin-si (KR); Jaemin Kim, Yongin-si (KR); Daeyon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/626,808

(22) Filed: Feb. 19, 2015

(30) Foreign Application Priority Data

Nov. 26, 2014 (KR) .......................... 10-2014-0166622

(51) Int. Cl.
*H01M 10/44* (2006.01)
*H01M 10/42* (2006.01)

(52) U.S. Cl.
CPC .. *H01M 10/4257* (2013.01); *H01M 2010/4271* (2013.01); *H01M 2220/30* (2013.01)

(58) Field of Classification Search
CPC ........................... H01M 10/425; H01M 2/1061
See application file for complete search history.

(56) References Cited

U.S. PATENT DOCUMENTS

| 6,403,251 | B1 * | 6/2002 | Baggaley et al. ............... 429/61 |
| 2012/0257349 | A1 * | 10/2012 | Bang et al. ............... 361/679.55 |
| 2012/0270074 | A1 | 10/2012 | Koh |
| 2012/0276419 | A1 | 11/2012 | Park |
| 2013/0045397 | A1 | 2/2013 | Pyo |
| 2014/0065448 | A1 | 3/2014 | Ahn et al. |
| 2014/0178716 | A1 | 6/2014 | Wang |
| 2014/0220387 | A1 | 8/2014 | Lee |
| 2014/0220389 | A1 | 8/2014 | Lee |
| 2014/0220390 | A1 | 8/2014 | Park et al. |

FOREIGN PATENT DOCUMENTS

| CN | 202231073 U | 5/2012 |
| KR | 10-2005-0069075 A | 7/2005 |
| KR | 10-2009-0027393 A | 3/2009 |
| KR | 10-2012-0122860 A | 11/2012 |
| KR | 10-2012-0123172 A | 11/2012 |
| KR | 10-2013-0042095 A | 4/2013 |
| KR | 10-1274923 B1 | 6/2013 |

(Continued)

OTHER PUBLICATIONS

Korean Notice of Allowance dated Apr. 29, 2015 for Korean Patent Application No. KR 10-2014-0166622 which corresponds to captioned U.S. Appl. No. 14/626,808.

(Continued)

*Primary Examiner* — Stewart Fraser
*Assistant Examiner* — Olatunji Godo
(74) *Attorney, Agent, or Firm* — Knobbe, Martens, Olson & Bear, LLP

(57) ABSTRACT

A rechargeable battery is disclosed. In one aspect, the battery includes first and second battery cells facing each other and a case comprising first and second insertion portions, into which the first and second battery cells are respectively inserted. The case also includes a circuit accommodator formed between the first and second insertion portions and accommodating a protection circuit configured to control charging and discharging operations of the first and second battery cells.

12 Claims, 4 Drawing Sheets

(56) References Cited

FOREIGN PATENT DOCUMENTS

| | | |
|---|---|---|
| KR | 10-2014-0032596 A | 3/2014 |
| KR | 10-2014-0081658 A | 7/2014 |
| KR | 10-2014-0100108 A | 8/2014 |
| KR | 10-2014-0100109 A | 8/2014 |
| KR | 10-2014-0100291 A | 8/2014 |

OTHER PUBLICATIONS

Korean Office Action dated Dec. 29, 2014 for Korean Patent Application No. KR 10-2014-0166621 corresponding to U.S. Appl. No. 14/626,763 which is related to captioned U.S. Appl. No. 14/626,808.

Korean Office Action dated Dec. 29, 2014 for Korean Patent Application No. KR 10-2014-0166622 which corresponds to captioned U.S. Appl. No. 14/626,808.

* cited by examiner

RECHARGEABLE BATTERY

CROSS-REFERENCE TO RELATED APPLICATIONS

This application claims the benefit of Korean Patent Application No. 10-2014-0166622, filed on Nov. 26, 2014, in the Korean Intellectual Property Office, the disclosure of which is incorporated herein in its entirety by reference.

This application relates to U.S. patent application entitled "SECONDARY BATTERY" (application Ser. No. 14/626,763), which is concurrently filed on the same date as this application and incorporated herein by reference in their entirety.

BACKGROUND

1. Field

The described technology generally relates to rechargeable batteries.

2. Description of the Related Technology

Due to the development of wireless Internet and communication technologies, portable electronic devices, such as a mobile phone and portable computers, are in wide use. An electronic device generally includes a rechargeable battery or a number of rechargeable batteries for use at various locations without connecting to the power grid.

SUMMARY OF CERTAIN INVENTIVE ASPECTS

One inventive aspect is a rechargeable battery having improved resistance to bending or twisting and accordingly, any resultant damage and loss of functionality.

Another aspect is a rechargeable battery that includes: first and second battery cells formed to face each other; and a case comprising first and second insertion portions, into which the first and second battery cells are respectively inserted, and a circuit accommodating portion that is formed between the first and second insertion portions and accommodates a protection circuit that controls charging and discharging operations of the first and second battery cells.

Each of the first and second insertion portions may include: a blocking portion defining assembly positions of the first and second battery cells; and a rim portion extending from the blocking portion, surrounding front ends of the first and second battery cells, and forming an opening where the first and second battery cells are accommodated.

The rim portion may completely surround an outer side of the front ends of the first and second battery cells.

The rim portion may have a shape conforming to the front ends of the first and second battery cells.

The rim portion may include: a pair of long side portions covering long side portions of the first and second battery cells; a pair of short side portions covering short side portions of the first and second battery cells; and a corner portion covering corner portions between the long side portions and the short side portions of the first and second battery cells.

The rim portion may be formed seamlessly.

Each of the first and second battery cells may include a cell main body and an electrode tab protruding from the cell main body.

The electrode tabs of the first and second battery cells may protrude in a direction in which they face each other.

The electrode tabs of the first and second battery cells may extend to the circuit accommodating portion by detouring around the blocking portion.

The electrode tabs of the first and second battery cells may be inserted into connection holes in the protection circuit accommodated in the circuit accommodating portion.

The circuit accommodating portion may include: a main body integrally extending from the first and second insertion portions; and a cover coupled to the main body to form an accommodation space with the main body.

The main body of the circuit accommodating portion may integrally extend from the rim portion of the first and second portions such that the main body integrally extends from a pair of short side portions and a long side portion between the short side portions of the rim portion.

One main surface of the main body of the circuit accommodating portion may be exposed, and the cover may be coupled to the exposed main surface.

The first and second battery cells and the case may be covered using a single label sheet.

These general and specific embodiments may be implemented by using a system, a method, a computer program, or a combination of the system, the method, and the computer program.

Another aspect is a rechargeable battery comprising: first and second battery cells facing each other; and a case comprising first and second insertion portions, into which the first and second battery cells are respectively inserted, and a circuit accommodator formed between the first and second insertion portions and accommodating a protection circuit configured to control charging and discharging operations of the first and second battery cells.

In the above battery, each of the first and second insertion portions comprises: a blocking portion defining assembly positions of the first and second battery cells; and a rim portion extending from the blocking portion, surrounding front ends of the first and second battery cells, and forming an opening where the first and second battery cells are accommodated. In the above battery, the rim portion substantially surrounds the entirety of an outer side of the front ends of the first and second battery cells. In the above battery, the rim portion has a shape conforming to the front ends of the first and second battery cells. In the above battery, the rim portion comprises: a pair of long side portions covering long side portions of the first and second battery cells; a pair of short side portions covering short side portions of the first and second battery cells; and a corner portion covering corner portions formed between the long side portions and the short side portions of the first and second battery cells. In the above battery, the rim portion is formed seamlessly. In the above battery, each of the first and second battery cells comprises a cell main body and an electrode tab extending outwardly from the cell main body. In the above battery, the electrode tabs of the first and second battery cells extend in directions facing each other.

In the above battery, the electrode tabs of the first and second battery cells extend to the circuit accommodator by detouring around the blocking portion. In the above battery, the electrode tabs of the first and second battery cells are inserted into connection holes in the protection circuit. In the above battery, the circuit accommodator comprises: a main body integrally extending from the first and second insertion portions; and a cover coupled to the main body to form an accommodation space with the main body. In the above battery, the main body of the circuit accommodating portion integrally extends from the rim portion of the first and second portions such that the main body integrally extends from a pair of short side portions and a long side portion formed between the short side portions of the rim portion. In the above battery, one main surface of the main body of the circuit accommodating portion is exposed, and wherein the cover is coupled to the exposed main surface. The above battery further comprises a single label sheet covering the first and second battery cells and the case.

Another aspect is a rechargeable battery comprising: first and second battery cells facing each other; and a case having first and second openings formed at opposing sides thereof, which at least portions of the first and second battery cells are respectively inserted into the first and second openings, and wherein the case accommodates, between the first and second openings, a protection circuit configured to control charging and discharging operations of the first and second battery cells.

In the above battery, a blocking portion is formed in each of the first and second openings, and wherein the blocking portion is configured to block the corresponding battery cell from being further inserted into the case. In the above battery, the first and second openings respectively fully surround the portions of the first and second battery cells. In the above battery, each of the first and second battery cells comprises a cell main body and an electrode tab extending outwardly from the cell main body. In the above battery, the electrode tabs of the first and second battery cells extend in directions facing each other. In the above battery, the protection circuit has connection holes, and wherein the electrode tabs of the first and second battery cells are respectively inserted into the connection holes of the protection circuit.

DETAILED DESCRIPTION OF CERTAIN INVENTIVE EMBODIMENTS

Figure 1:
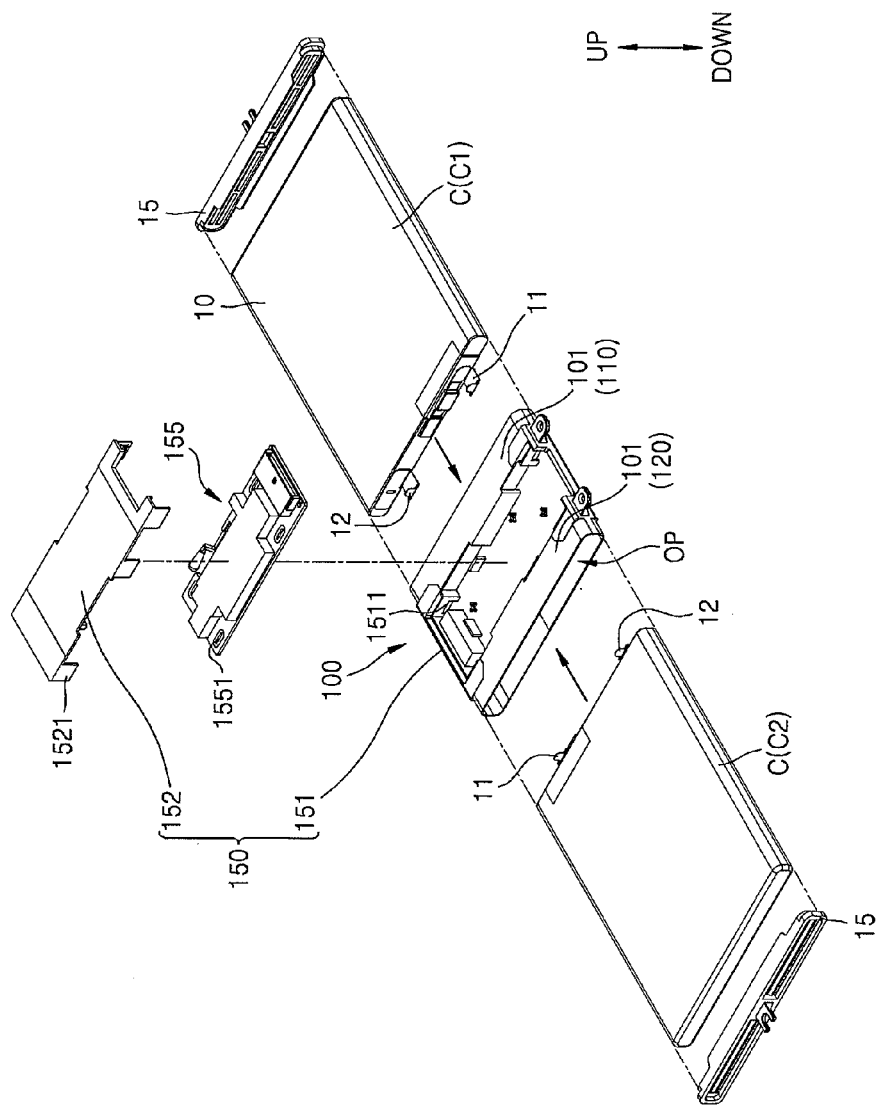
FIG. 1 is a disassembled perspective view of a rechargeable battery according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 2:
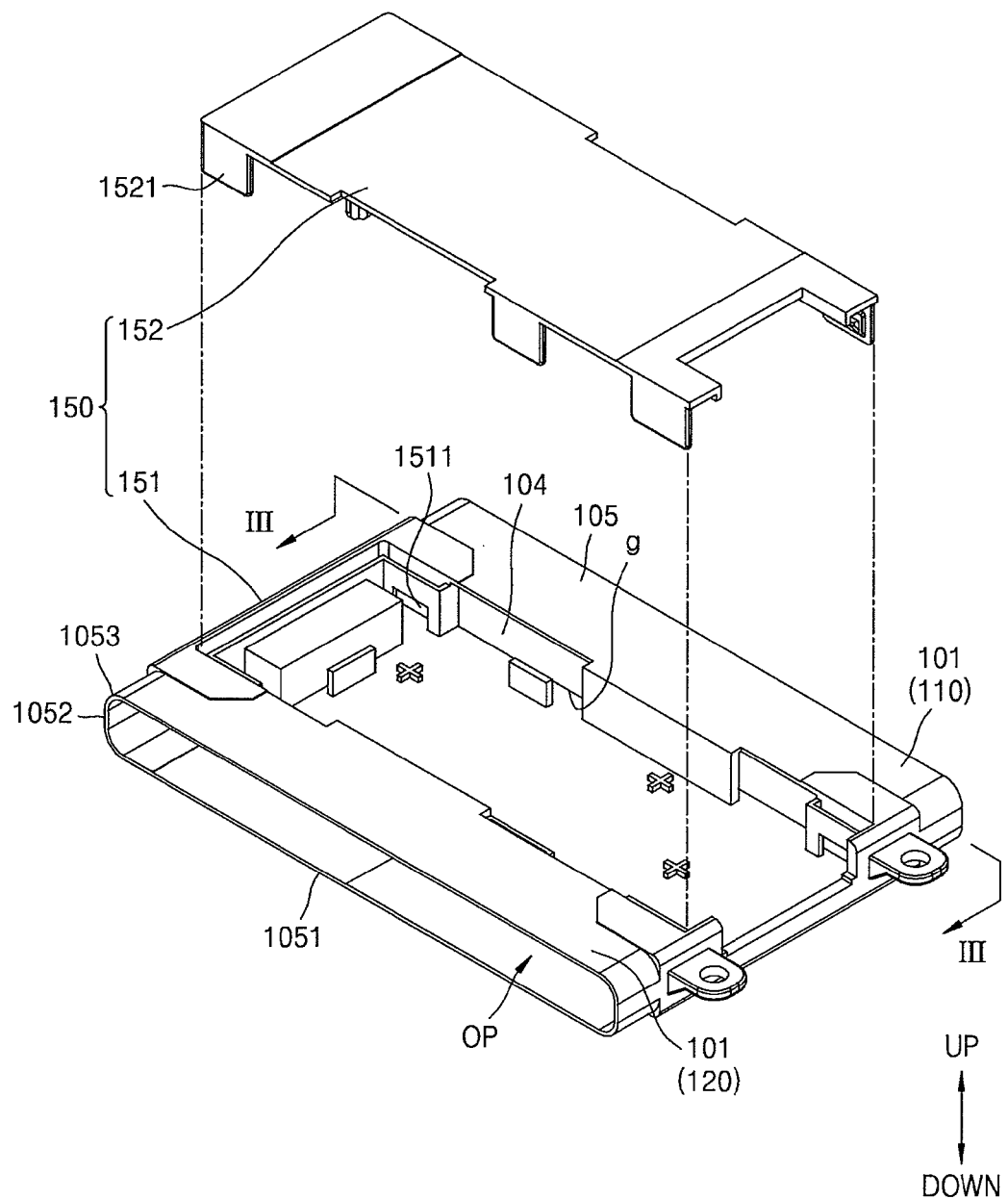
FIG. 2 is a disassembled perspective view of a case illustrated in FIG. 1.
Figure 3:
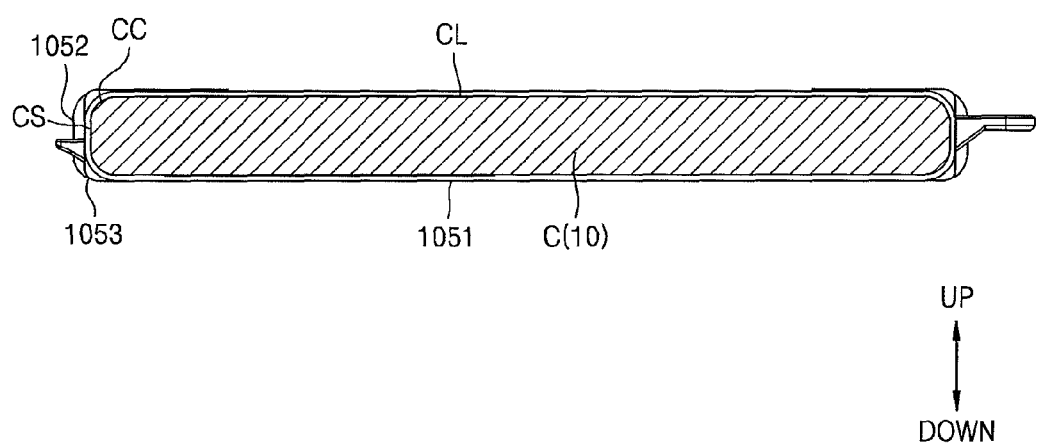
FIG. 3 is a cross-sectional view taken along a line of FIG. 2.

Referring to FIGS. 1-3, a rechargeable battery includes first and second battery cells C1 and C2 formed to face each other. The rechargeable battery also includes a case 100, in which the first and second battery cells C1 and C2 are inserted to be assembled and a protection circuit 155 that controls charging and discharging operations of the first and second battery cells C1 and C2 is accommodated.

The case 100 includes first and second insertion portions 110 and 120, into which the first and second battery cells C1 and C2 are respectively inserted. The case 100 also includes a circuit accommodating portion 150 accommodating the protection circuit 155.

The first and second battery cells C1 and C2 may have substantially the same structure and shape. In the present disclosure, a battery cell C refers to one of the first and second battery cells C1 and C2 or both the first and second battery cells C1 and C2.

The battery cell C may include a cell main body 10 and first and second electrode tabs 11 and 12 protruding from the cell main body 10. In the present disclosure, the first and second electrode tabs 11 and 12 of the first and second battery cells C1 and C2 may extend in directions facing each other.

The first and second battery cells C1 and C2 may include first and second electrode tabs 11 and 12 having different polarities from each other. Here, the first and second electrode tabs 11 and 12 may be formed on the same surface of the cell main body 10, for example, on a front surface of the cell main body 10 in an assembly direction of the first and second battery cells C1 and C2. Also, the first and second electrode tabs 11 and 12 of the first battery cell C1 and the first and second electrode tabs 11 and 12 of the second battery cell C2 may extend in directions facing each other.

For example, the first and second electrode tabs 11 and 12 of the first and second battery cells C1 and C2 face each other. Alternatively, as illustrated in FIG. 1, the first electrode tab 11 and the second electrode tab 12 of the first battery cell C1 face the second electrode tab 12 and the first electrode tab 11 of the second battery cell C2. The first and second electrode tabs 11 and 12 of the first and second battery cells C1 and C2 may be formed to face each other in an alternating manner. For example, arrangement of the first and second electrode tabs 11 and 12 of the first and second battery cells C1 and C2 may vary depending on a connection manner of the first and second battery cells C1 and C2, that is, whether they are connected in series or in parallel.

In some embodiments, as shown in FIG. 3, the cell main body 10 has a substantially rectangular cross-section having a long side portion CL and a short side portion CS. For example, the cell main body 10 includes a pair of parallel long side portions CL, a pair of parallel short side portions CS, and round corner portions CC between the long side portions CL and the short side portions CS to connect the long side portions CL to the short side portions CS.

The first and second battery cells C1 and C2 are inserted into the case 100. To this end, the case 100 may include the first and second insertion portions 110 and 120 into which the first and second battery cells C1 and C2 are inserted to be assembled. Referring to FIG. 2, the first and second insertion portions 110 and 120 each include a blocking portion 104 that defines assembly positions of the first and second battery cells C1 and C2 and a rim portion 105 that extends from the blocking portion 104 in a direction opposite to the assembly direction and forms an opening OP to accommodate the first and second battery cells C1 and C2.

The first and second insertion portions 110 and 120 may have substantially the same shape to accommodate the first and second battery cells C1 and C2 having substantially the same structure. In the present disclosure, an insertion portion 101 may refer to one of the first and second insertion portions 110 and 120 or both the first and second insertion portions 110 and 120.

The first and second battery cells C1 and C2 are assembled by being inserted into the case 100 through different openings OP that are formed at opposite positions of the case 100. The first and second battery cells C1 and C2 may be assembled in a direction in which they face each other. The openings OP accommodate a front end of the battery cell C, and the openings OP may be defined by the rim portion 105 that surrounds the front end of the battery cell C. An outer side of the front end of the battery cell C assembled through the openings OP faces inner sides of the rim portion 105.

The rim portion 105 may substantially surround the entire outer side of the front end of the battery cell C. That is, the rim portion 105 surrounds the front end of the battery cell C in an assembly direction such that the whole outer side of the front end of the battery cell C is surrounded. The rim portion 105 may have a shape conforming to the front end of the battery cell C.

The rim portion 105 can be formed to substantially surround the entire outer side of the front end of the battery cell C and may be formed seamlessly. That is, the rim portion 105 may extend along the outer side of the front end of the battery cell C seamlessly. Extension of the rim portion 105 seamlessly means that the rim portion 105 is not formed with separate members that contact each other or separate members that connect to each other, and the rim portion 105 may be formed as a single body.

Referring to FIG. 3, the rim portion 105 includes a pair of long side portions 1051 covering the long side portions CL of the battery cell C, a pair of short side portions 1052 covering the short side portions CS of the battery cell C, and a corner portion 1053 covering the corner portions CC between the long side portions CL and the short side portions CS of the battery cell C.

The rim portion 105 may extend outwardly from the blocking portion 104 defining an assembly position of the battery cell C. That is, the rim portion 105 may extend from the blocking portion 104 toward the battery cell C and cover the outer side of the front end of the battery cell C.

The blocking portion 104 may abut on the front end of the battery cell C in an assembly direction to control a position of the battery cell C, thereby defining the assembly position. That is, the blocking portion 104 allows the battery cell C to enter up to the assembly position of the battery cell C in the assembly direction but blocks any further entry thereof so as to define the assembly position of the battery cell C.

The blocking portion 104 may define a boundary position up to which entry of the battery cell C is allowed and define a boundary of the insertion portion 101. That is, the insertion portion 101 and the circuit accommodating portion 150 may be distinguished from each other with respect to the blocking portion 104.

Referring to FIGS. 1 and 2 together, a gap g is formed under the blocking portion 104, around which the first and second electrode tabs 11 and 12 of the battery cell C may detour. The first and second electrode tabs 11 and 12 may detour around the blocking portion 104 via the gap g under the blocking portion 104 and extend to the circuit accommodating portion 150, and may be connected to the protection circuit 155 in the circuit accommodating portion 150. For example, the first and second electrode tabs 11 and 12 are inserted into a connection hole 1551 formed in the protection circuit 155. The first and second electrode tabs 11 and 12 form a path for charging and discharging current of the battery cell C, and charging and discharging current may flow to the protection circuit 155 through the first and second electrode tabs 11 and 12.

The circuit accommodating portion 150 accommodating the protection circuit 155 is formed between the first and second insertion portions 110 and 120. The circuit accommodating portion 150 may include a main body 151 and a cover 152 that is coupled to the main body 151 to form accommodation space with the main body 151.

Referring to FIG. 2, the main body 151 of the circuit accommodating portion 150 integrally extends from the first and second insertion portions 110 and 120 formed on two sides of the main body 151. For example, the main body 151 integrally extends from the rim portion 105 of the first and second insertion portions 110 and 120. Furthermore, the main body 151 may integrally extend from the pair of the short side portions 1052 and the long side portion 1051 between the short side portions 1052 of the rim portion 105. The main body 151 may include a lower surface that integrally extends from one long side portion 1051 of the rim portion 105.

One of the main surfaces (e.g., upper and lower surfaces) of the main body 151 of the circuit accommodating portion 150 that are substantially parallel to a main surface of the battery cell C may be exposed (in the present embodiment, the main surface is the upper surface). The main surface of the battery cell C refers to a surface of the battery cell C that has the greatest area of the battery cell C, which has a substantially hexahedral shape. For example, the upper and lower surfaces of the battery cell C are main surfaces thereof. Also, the main body 151 of the circuit accommodating portion 150 may have a shape in which an upper surface thereof is exposed, and the cover 152 may be coupled to the main body 151 over the exposed upper surface of the main body 151.

The protection circuit 155 may be accommodated in the circuit accommodating portion 150 into an opening defined by the upper surface of the main body 151. Furthermore, the circuit accommodating portion 150 may be substantially completely assembled once the cover 152 is coupled to the main body 151 and covers the exposed upper surface of the main body 151.

The main body 151 may be coupled to the cover 152 of the circuit accommodating portion 150 via hook coupling. For example, one of the main body 151 and the cover 152 of the circuit accommodating portion 150 includes a hook 1521, and the other includes a coupling hole 1511 to which the hook 1521 is coupled. However, the described technology is not limited thereto, and other various coupling methods that are well known in the art may be applied.

The cover 152 may be coupled to the main body 151 of the circuit accommodating portion 150 to form accommodation space where the protection circuit 155 is accommodated.

An upper surface or a lower surface of the circuit accommodating portion 150 may be recessed so as to form a step with respect to an upper or lower surface of the insertion portion 101 in a substantially vertical direction.

The circuit accommodating portion 150 may provide sufficient accommodation space to accommodate the protection circuit 155 and spare space. The spare space remaining after accommodating the protection circuit 155 is dead space, which increases the total volume of a rechargeable battery without substantially contributing to charging and discharging operations of the rechargeable battery.

The upper or lower surface of the circuit accommodating portion 150 may be recessed, so as to reduce dead space of the circuit accommodating portion 150 and the total volume of the rechargeable battery. For example, the upper surface of the circuit accommodating portion 150, that is, an upper surface of the cover 152, or the lower surface of the circuit accommodating portion 150, that is, a lower surface of the main body 151, is recessed.

The step structure of the circuit accommodating portion 150 contributes not only to reducing the total volume of the rechargeable battery but also to compact mounting of the rechargeable battery if mounting space of the rechargeable battery includes a step due to characteristics of a set device (not shown).

The rechargeable battery may be used as power supply of a laptop computer (not shown). The rechargeable battery may be mounted under a touch pad (not shown) of the laptop computer, and the laptop computer may have a relatively smaller thickness in a portion corresponding to the touch pad than other portions thereof. Also, the rechargeable battery having a shape conforming to a stepped shape of the touch pad may be easily mounted in the laptop computer without physical interference with the touch pad and needing to change the design of the laptop computer.

For example, when the upper or lower surface of the circuit accommodating portion 150 is recessed, a step is formed between the circuit accommodating portion 150 and the insertion portion 101, and the step shape of the rechargeable battery conforms with a step of a set device (not shown) to prevent physical interference with the set device but provides exact fitting, thereby effectively preventing movement or shaking of the rechargeable battery inside the set device.

The protection circuit 155 is accommodated in the circuit accommodating portion 150. The protection circuit 155 is electrically connected to the battery cell C. The first and second electrode tabs 11 and 12 of the battery cell C may extend to the circuit accommodating portion 150 to be connected to the protection circuit 155. For example, when referring to FIGS. 1 and 2 together, the first and second electrode tabs 11 and 12 extend into the circuit accommodating portion 150 via the gap g under the blocking portion 104 and are connected to the protection circuit 155 in the circuit accommodating portion 150.

For example, the connection hole 1551, into which the first and second electrode tabs 11 and 12 are inserted, may be formed in the protection circuit 155 (circuit board). That is, the protection circuit 155 may be electrically connected to the first and second battery cells C1 and C2, and different connection holes 1551 for respectively connecting to the first and second battery cells C1 and C2 may be formed in both sides of the protection circuit 155.

The protection circuit 155 may control charging and discharging operations of the first and second battery cells C1 and C2 connected thereto on two sides of the protection circuit 155. For example, the protection circuit 155 may collect state information of the first and second battery cells C1 and C2, such as a voltage, a current, or a temperature, to monitor a state of the battery cell C (the first and second battery cells C1 and C2). Then the protection circuit 155 may control charging and discharging operations of the first and second battery cells C1 and C2 based on a monitoring result.

The protection circuit 155 may electrically connect together the first and second battery cells C1 and C2 connected thereto on two sides of the protection circuit 155. For example, the protection circuit 155 connects the first and second battery cells C1 and C2 in series or in parallel. Furthermore, the first and second battery cells C1 and C2 are connected in series or in parallel according to electrical output characteristics required by the rechargeable battery.

Figure 4:
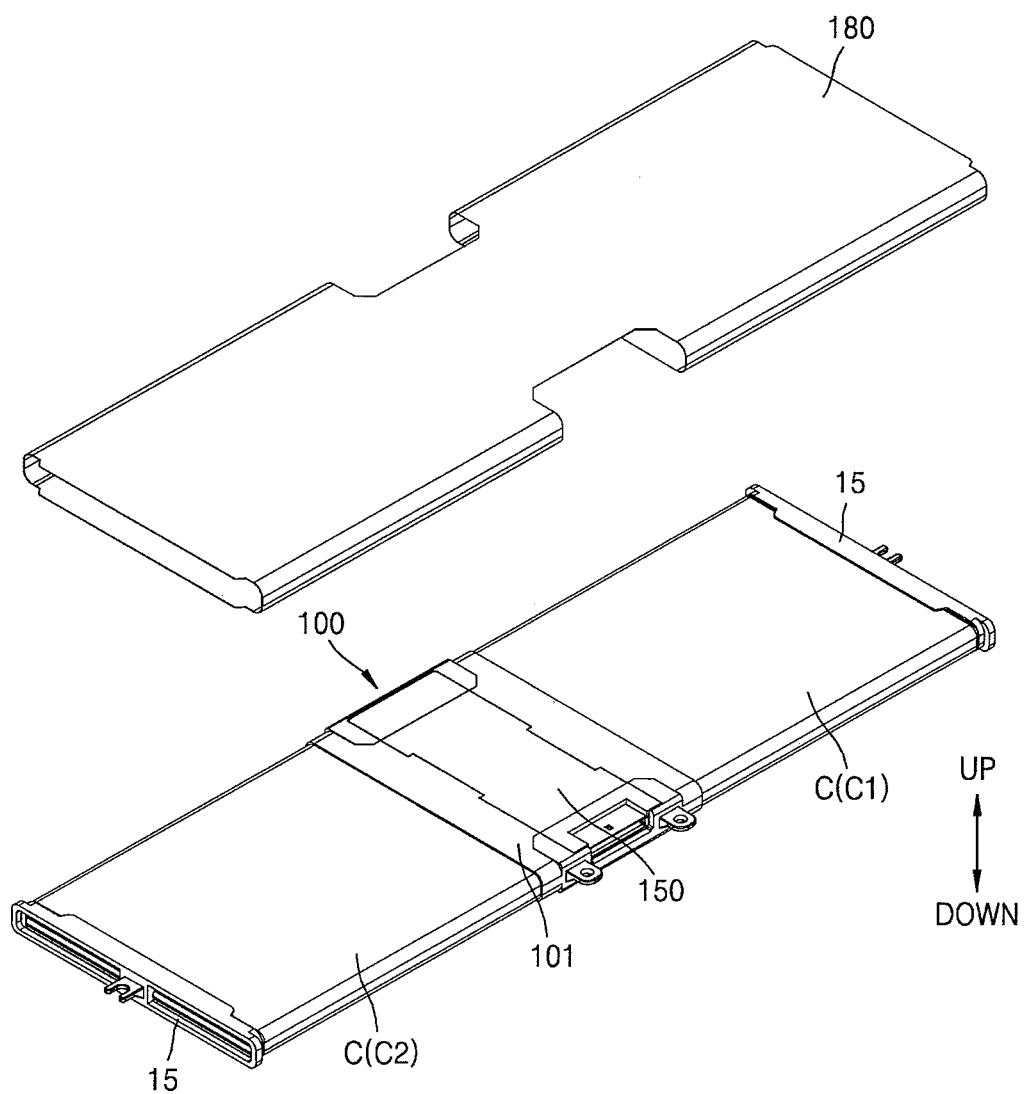
FIG. 4 is a perspective view illustrating an assembly state of a battery cell and a case.

FIG. 4 is a perspective view illustrating a state in which the battery cell C and the case 100 are assembled. Referring to FIG. 4, a label sheet 180 may be attached on the battery cell C and the case 100, into which the battery cell C is inserted. For example, the label sheet 180 is attached to cover both the first and second battery cells C1 and C2 and the case 100, into which the first and second battery cells C1 and C2 are inserted, altogether.

According to an embodiment, the label sheet 180 forms an external shape of a rechargeable battery. That is, the battery cell C and the case 100, to which the label sheet 180 is attached, may be mounted in a set device (not shown) as a complete product without any additional casing. That is, according to an embodiment, a portion of the battery cell C is inserted into the case 100, and the remaining portion of the battery cell C may not be accommodated in another casing except the label sheet 180 but be exposed to the environment. Also, in FIG. 4, a cell cover 15 is installed on an exposed surface of the battery cell C.

According to at least one of the disclosed embodiments, a case 100 that is assembled so that a portion of a battery cell C is inserted thereinto is used. The case 100 includes the insertion portion 101 that surrounds the outer side of the front end of the battery cell C. Here, the insertion portion 101 may improve the resistance of a rechargeable battery against bending or twisting by surrounding the whole outer side of the front end of the battery cell C.

According to a comparative example, the battery cell C and the protection circuit 155 may be accommodated in upper and lower cases (not shown) that are assembled in a direction in which they face each other. In a case structure as described above, the upper and lower cases (not shown) are formed to cover two, upper and lower surfaces of the battery cell C and the protection circuit 155 and thus may be weak against bending or twisting of a rechargeable battery.

In some embodiments, the case 100 includes the insertion portion 101 surrounding substantially the entire outer side of the front end of the battery cell C so as to surround the whole outer side of the battery cell C including the two, upper and lower surfaces. According to some embodiments, the resistance of the rechargeable battery against bending or twisting may increase. Consequently, damage to the rechargeable battery due to bending or twisting may be prevented.

According to at least one of the disclosed embodiments, as a case structure surrounding the entire end portion of a battery cell is included, the resistance of a rechargeable battery against bending or twisting is increased. Thus, damage to the rechargeable battery due to bending or twisting may be prevented.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A rechargeable battery comprising:
   first and second battery cells facing each other; and
   a case comprising first and second insertion portions, into which the first and second battery cells are respectively partially inserted, and a circuit accommodator formed between the first and second insertion portions and accommodating a protection circuit configured to control charging and discharging operations of the first and second battery cells,
   wherein a main surface of the protection circuit and main surfaces of the first and second battery cells face the same upward-downward direction,
   wherein the circuit accommodator comprises:
   a main body integrally extending from the first and second insertion portions; and
   a cover coupled to the main body to form an accommodation space with the main body, and wherein the rechargeable battery further comprises a single sheet covering top and bottom surfaces of the first and second battery cells and the cover, and wherein only upper portions of the first and second battery cells, facing each other, are respectively partially inserted into the first and second insertions portions of the case.

2. The rechargeable battery of claim 1, wherein each of the first and second insertion portions comprises:

a blocking portion defining assembly positions of the first and second battery cells; and a rim portion extending from the blocking portion, surrounding front ends of the first and second battery cells, and forming an opening where the first and second battery cells are accommodated.

3. The rechargeable battery of claim 1, wherein the rim portion substantially surrounds the entirety of an outer side of the front ends of the first and second battery cells.

4. The rechargeable battery of claim 2, wherein the rim portion has a shape conforming to the front ends of the first and second battery cells.

5. The rechargeable battery of claim 2, wherein the rim portion comprises:

a pair of long side portions covering long side portions of the first and second battery cells;

a pair of short side portions covering short side portions of the first and second battery cells; and a corner portion covering corner portions formed between the long side portions and the short side portions of the first and second battery cells.

6. The rechargeable battery of claim 2, wherein the rim portion is formed seamlessly.

7. The rechargeable battery of claim 2, wherein each of the first and second battery cells comprises a cell main body and an electrode tab extending outwardly from the cell main body.

8. The rechargeable battery of claim 2, wherein the electrode tabs of the first and second battery cells extend in directions facing each other.

9. The rechargeable battery of claim 7, wherein the electrode tabs of the first and second battery cells extend to the circuit accommodator by detouring around the blocking portion.

10. The rechargeable battery of claim 7, wherein the electrode tabs of the first and second battery cells are inserted into connection holes in the protection circuit.

11. The rechargeable battery of claim 7, wherein the main body of the circuit accommodating portion integrally extends from the rim portion of the first and second portions such that the main body integrally extends from a pair of short side portions and a long side portion formed between the short side portions of the rim portion.

12. The rechargeable battery of claim 1, wherein one main surface of the main body of the circuit accommodating portion is exposed, and wherein the cover is coupled to the exposed main surface.

* * * * *